(12) United States Patent
Kuroda et al.

(10) Patent No.: US 6,255,782 B1
(45) Date of Patent: Jul. 3, 2001

(54) FLAT TYPE FLUORESCENT LAMP

(75) Inventors: Yasunao Kuroda; Kenichiro Matsumoto; Mitsuya Ozaki, all of Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 0 days.

(21) Appl. No.: 09/569,752

(22) Filed: May 12, 2000

(30) Foreign Application Priority Data

May 12, 1999 (JP) ................................... 11-130888
Apr. 4, 2000 (JP) ................................... 12-101820

(51) Int. Cl.$^7$ ....................................................... G09G 3/10
(52) U.S. Cl. ....................... 315/169.1; 313/568; 313/576; 313/581; 362/260; 363/71
(58) Field of Search .............................. 315/169.1, 169.3, 315/169.4; 313/484, 568, 576, 581; 362/260; 363/71, 153

(56) References Cited

U.S. PATENT DOCUMENTS

| 4,882,520 | * | 11/1989 | Tsunekawa et al. | 313/576 |
|---|---|---|---|---|
| 5,008,789 | * | 4/1991 | Arai et al. | 362/260 |
| 5,220,442 | * | 6/1993 | Dingwall et al. | 359/53 |
| 5,245,525 | * | 9/1993 | Galloway et al. | 363/71 |
| 5,272,419 | * | 12/1993 | Park | 315/169.1 |
| 5,280,221 | * | 1/1994 | Okamoto et al. | 315/169.3 |
| 5,307,188 | * | 4/1994 | Dingwall et al. | 359/53 |
| 5,391,965 | * | 2/1995 | Teva | 315/169.1 |
| 5,825,345 | * | 10/1998 | Takahama et al. | 345/104 |
| 5,920,155 | * | 7/1999 | Kanda et al. | 315/307 |
| 5,965,988 | * | 10/1999 | Volkommer et al. | 313/497 |
| 6,081,076 | * | 6/2000 | Ogawa | 315/241 P |

* cited by examiner

Primary Examiner—Don Wong
Assistant Examiner—Thuy Vinh Tran
(74) Attorney, Agent, or Firm—Merchant & Gould P.C.

(57) ABSTRACT

A flat type fluorescent lamp, obtaining an improvement in efficiency of brightness and being adjustable in an emitted light amount thereof, while maintaining a uniform light emission across the surface thereof, and illuminating with no use of mercury therein, comprising a sealed container being defined between a front glass substrate and a rear glass substrate which are hermetically bonded to each other, so as to enclose a rare gas as discharge gas therein, edge electrodes, having width from 2.5 mm to 10 mm and being provided at both end portions on one surface of the sealed container, and other edge electrodes, having width from 5 mm to 20 mm and being provided at both end portions on the other surface thereof, wherein the edge electrodes on the same side surfaces are connected to each other, a first inverter is connected between the one edge electrode P3 and a central electrode P6 which is provided in a central portion of the one surface, and a second inverter is connected between the other edge electrode P4 and the central electrode P6, wherein the first inverter and the second inverter provide rectangular waveform outputs, being same in frequency but having phases different to each other, thereby illuminating the lamp.

8 Claims, 3 Drawing Sheets

FLAT TYPE FLUORESCENT LAMP

BACKGROUND OF THE INVENTION

1. Field of the Invention

The present invention relates to a flat type fluorescent lamp for use in a device such as a transparent type liquid crystal display, specifically for use as a back light thereof, in particular, where no memory is used therein.

2. Description of Prior Art

In a flat type fluorescent lamp of the conventional art, using no mercury therein, as shown in FIGS. 6(a) and (b), a pair of electrodes 102 and 103, each being coated with a dielectric material, are positioned within a sealed container, which is formed by hermetically bonding a transparent front substrate 100 and a rear substrate 101 together, wherein a fluorescent material is applied upon the inner surfaces of the front substrate 100 and the rear substrate 101, and Xe (xenon) gas is contained within the sealed container.

High voltage is applied between the electrodes 102 and 103 to cause dielectric barrier discharge, thereby atoms of the xenon gas, being excited or energized, irradiate ultraviolet rays therefrom. Receiving the ultraviolet rays, the fluorescent material, being of a three-color combination, converts the ultraviolet emission into visible light of red, green and blue colors, thereby achieving a function as a white color fluorescent lamp.

However, with such a flat type fluorescent lamp, the discharge occurs locally as opposed to uniformly if the distance between the electrodes is made large so as to obtain a large discharge area, therefore it is impossible to obtain a uniform fluorescence over the surface thereof. Because of this, for achieving a flat fluorescent lamp having large area, it is essential to newly devise the structure of the electrodes thereof.

Also, for the lamps having or using no mercury therein, a manner for increasing an efficiency of brightness comes to be a substantial challenge.

Further, the flat type fluorescent lamp, in particular, for use as a back light to be installed in a device such as a car navigation system, is required to be of high brightness, so that the display can be seen even in bright daylight surroundings, while it is required to be adjustable in the light amount emitted therefrom down to, for example, 3% of maximum radiation, in order to adjust for the greatly lesser light levels present inside of the car operated when driving during the night.

SUMMARY OF THE INVENTION

An object of the present invention, for dissolving drawbacks of the conventional arts mentioned above, is to provide a flat type fluorescent lamp, wherein the structure of the electrodes and the voltage waveforms applied thereto are newly devised, to thereby obtain an improvement in the efficiency of brightness while maintaining uniform emission of light, and further enabling a broad range of control of the amount of light irradiated therefrom.

According to the present invention, for accomplishing the object mentioned above, there is provided a flat type fluorescent lamp, which produces light with no use of mercury therein, comprising:

a sealed container being defined between a front substrate and a rear substrate which are hermetically bonded to each other, so as to enclosed a rare gas as discharge gas therein;

edge electrodes being provided at both end portions on a surface of said sealed container;

other edge electrodes being provided at both end portions on the other surface of said sealed container, wherein the edge electrodes on the same side surfaces are connected to each other, respectively;

a first inverter being connected between one of said edge electrodes and a central electrode which is provided in a central portion of said one of the surfaces; and a second inverter being connected between the other of said edge electrodes and said central electrode, wherein said first inverter and said second inverter provide rectangular waveform outputs, being same in frequency thereof and having phases different to each other, thereby energizing the lamp.

Also, according to the present invention, in the flat type fluorescent lamp as defined in the above, one belt-like electrode is provided between each of both edge electrodes on said surface and said central electrode, while three belt-like electrodes are provided between said other edge electrodes on said other surface, wherein a width of the belt-like electrode that is positioned at a middle among said electrodes lies within a region within ±1 mm with respect to the width of said central electrode, and there are defined distances between said electrodes, respectively.

Further, according to the present invention, in the flat type fluorescent lamp as defined in the above, the distances between said electrodes lie from 2 mm to 4 mm.

According to the present invention, in the flat type fluorescent lamp as defined in the above, all of the electrodes on said surface are connected to one another, while all of the electrodes on said other surface are connected to one another, and either said first inverter or said second inverter is connected between them.

According to the present invention, in the flat type fluorescent lamp as defined in the above, the thickness of each of said substrate is from 1.1 mm to 4 mm.

According to the present invention, in the flat type fluorescent lamp as defined in the above, the thickness of a discharge space defined therein is from 1.3 mm to 4 mm.

According to the present invention, in the flat type fluorescent lamp as defined in the above, pressure of the gas is set from 150 torr to 400 torr, and partial pressure of an excitation gas is from 7.5% to 30%.

BRIEF DESCRIPTION OF THE DRAWINGS

FIGS. 6(a) and (b) are plan views of the conventional flat type light source and the C—C line cross-section thereof, respectively.

DETAILED DESCRIPTION OF PREFERRED EMBODIMENT(S)

Figure 1:
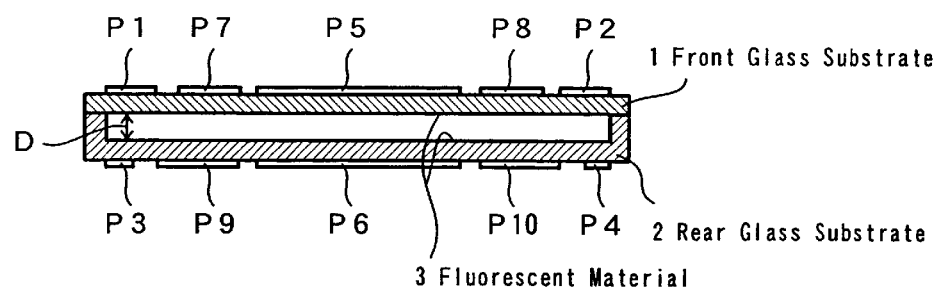
FIG. 1 is a cross-sectional view of a flat type fluorescent lamp according to the present invention.
Figure 2:
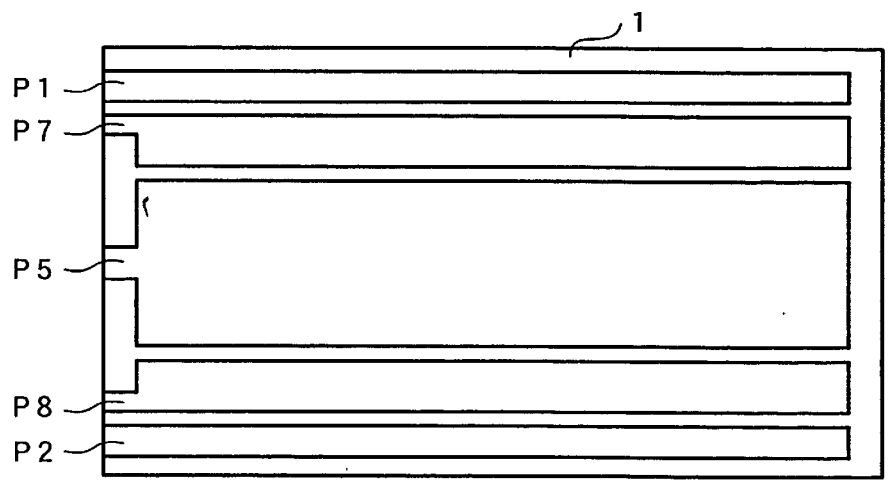
FIG. 2 is a plan view of the flat type fluorescent lamp according to the present invention.
Figure 3:
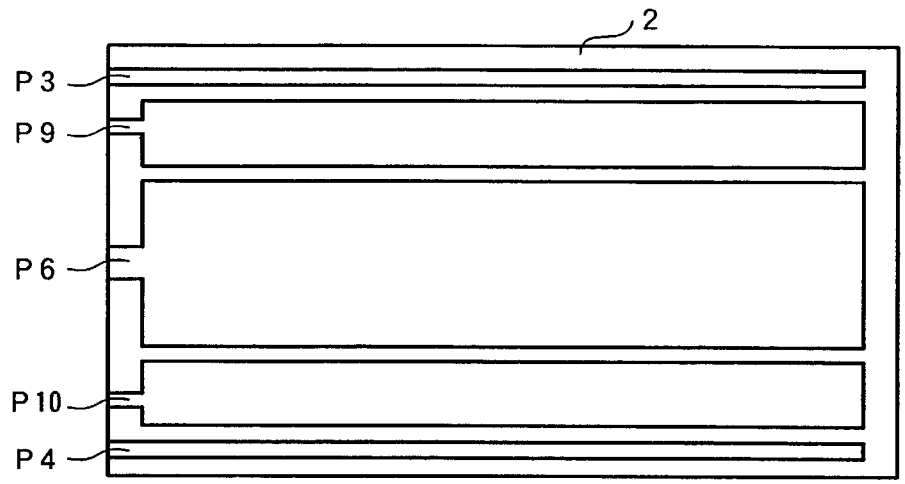
FIG. 3 is a bottom view of the flat type fluorescent lamp according to the present invention.
Figure 4:
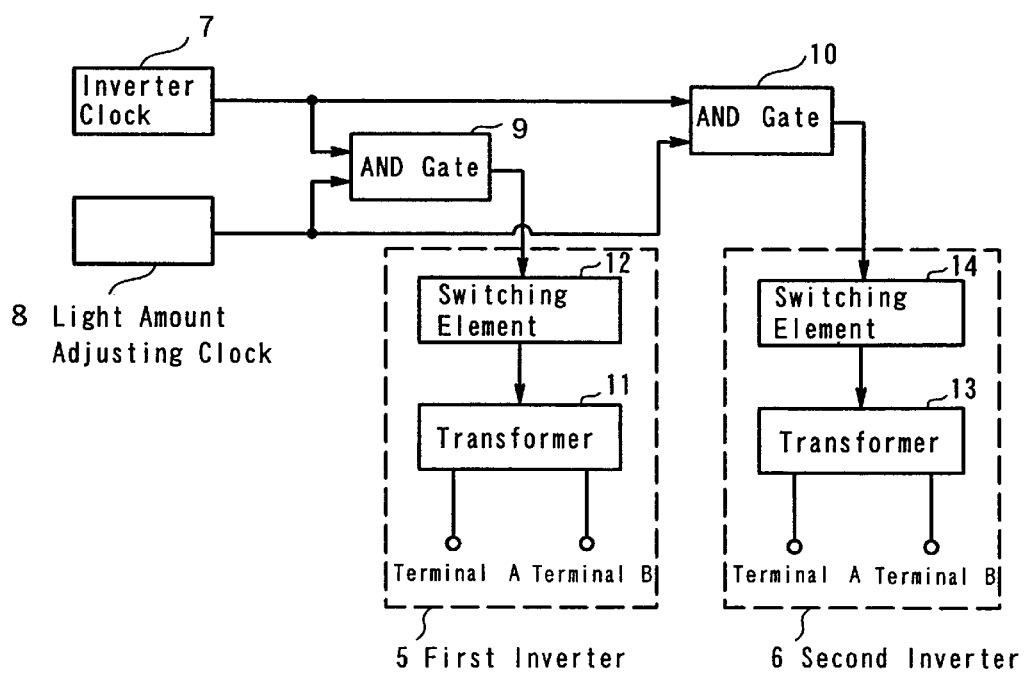
FIG. 4 is a block diagram of an energizing circuit.
Figure 5:
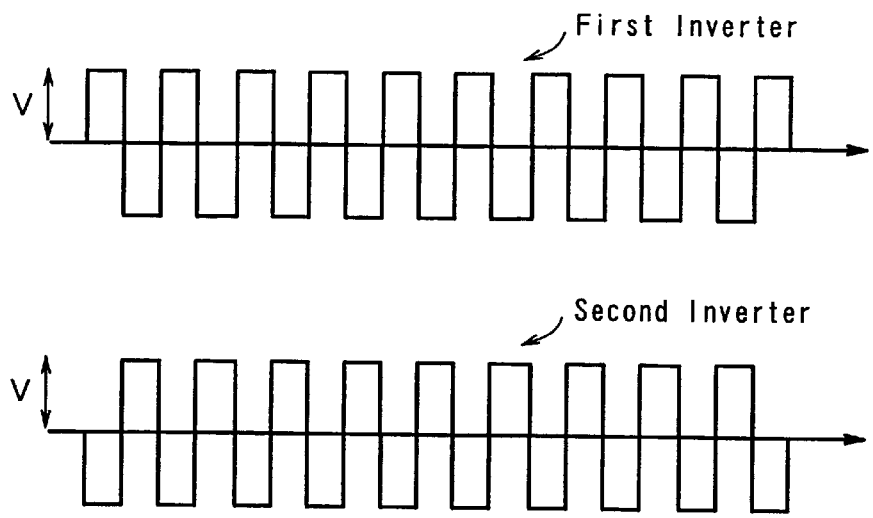
FIG. 5 is a view illustrating output wave-forms of an inverter.
Figure 5:
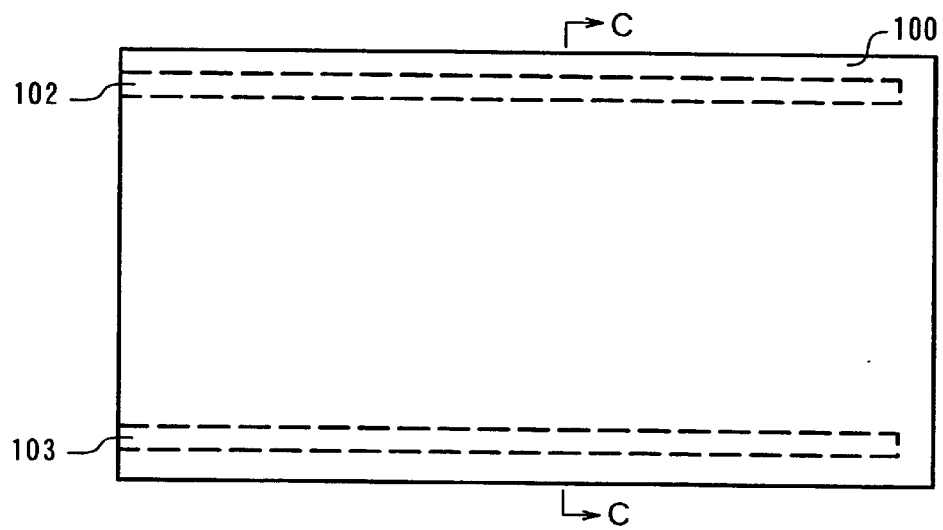
Figure 5:
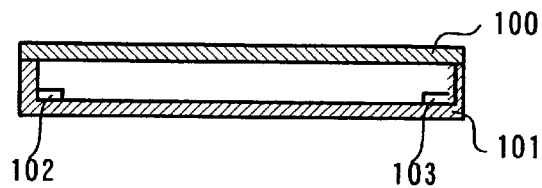

Hereinafter, embodiments according to the present invention will be fully explained with reference to the attached drawings. Here, FIG. 1 is a cross-sectional view of a flat type fluorescent lamp according to the present invention; FIG. 2 is a plan view of the same; FIG. 3 is a bottom view of the same; FIG. 4 is a block diagram of an energizing circuit; and FIG. 5 is a view illustrating output wave-forms of an inverter.

The flat type fluorescent lamp according to the present invention, as shown in FIG. 1, comprises a sheet-like transparent front glass substrate 1 and a tray-like rear glass substrate 2 opposing to the front glass substrate 1, wherein they are bonded through burn-in or fusion of frit (low melting point glass), so as to form an enclosed or sealed container (a discharge space) therebetween. However, the rear glass substrate 2 need not necessarily be of a tray-like shape, but it may be formed in a sheet-like form, the use of which involves forming the sealed container by bonding the sheet-like front glass substrate and the sheet-like rear glass substrate 2 about a spacer positioned therebetween.

Upon the inner surface of the front glass substrate 1 is applied fluorescent material 3, enabling emission of visible light with greatest possible efficiency, in response to the wavelength of the ultraviolet rays released due to excitation of the rare gas, which will be mentioned later. The fluorescent material 3 is applied upon a side surface being opposite to that of electrodes which will be mentioned later, for the purpose of preventing deterioration thereof. However, the light emitting surface is defined not by the route or path of discharging, but by the surface of electrode, therefore there will hardly occur deterioration due to the flow of electrons as in the conventional art, and therefore it is also possible to apply the fluorescent material 3 upon both inner surfaces of the front glass substrate 1 and the rear glass substrate 2.

The sealed container is preferably made of a glass substrate in the interest of obtaining a stable dielectric barrier discharge, and of reduction of costs. In a case where the material of the container is glass, there is a necessity for the thickness to be from 2 mm to 4 mm if it has a diagonal length of about 7 inches.

However, inserting a spacer having a thickness of about 0.2 mm and width equal to the thickness of the discharge space, it is possible to make thinner the thickness of the glass substrates, down to 1.1 mm. At a thickness less than this, it is impossible to obtain the strength being necessary therefor, and on the contrary, if the substrate is too thick, the voltage for initiating the discharge comes to be prohibitively high. The figures and dimensions indicated below are those applied in the case of the flat type fluorescent lamp being 7 inches in the diagonal length.

The thickness D of the discharge space is preferably from 1.3 to 4 mm. This is because if the discharge space is too narrow the local discharge is likely to occur, while alternatively it is impossible to maintain adequate structural strength of the flat type fluorescent lamp if the discharge space is too large.

Also, as shown in FIG. 2, the edge electrodes P1 and P2 are provided at both end portions of the outer surface of the front glass substrate 1, and further between the edge electrodes P1 and P2 are provided a central electrode P5 and two (2) belt-like electrodes P7 and P8.

Also, as shown in FIG. 3, the edge electrodes P3 and P4 are provided at both end portions of the outer surface of the rear glass substrate 2, and further between the edge electrodes P3 and P4 are provided a central electrode P6 and two (2) belt-like electrodes P9 and P10.

It is common to provide the electrodes only on the reverse side surface of the lamp, however the electrodes are provided on both the front and reverse sides because it is most preferable to excite all possible Xe (xenon) atoms within the discharge space in order to achieve an improvement, any of the edge electrodes P1 and P2, the central electrode P5, the belt-like electrodes P7 and P8, as the surface electrodes, must be made of transparent conduction film, such as ITO (indium tin oxide).

The width of the edge electrodes P1 and P2 is preferably between 5 mm and 20 mm, and that of the edge electrodes P3 and P4 is preferably between 2.5 mm and 10 mm. A relationship between the width of the edge electrode P1 and P2 and the width of the edge electrodes P3 and P4 is [width of edge electrodes P1 and P2]>[width of edge electrodes P3 and P4], however it is preferable that the width of the edge electrodes P1 and P2 is about two (2) times as large as the width of the edge electrodes P3 and P4. If the width of the electrodes is too narrow, the voltage for initiating the discharge comes to be high, while if it is too wide, the brightness on the portion of the electrodes is decreased, thereby lessening uniformity of discharge on the inner surface.

The distance between the central electrode P6 and the edge electrodes P3 and P4 lies preferably between 15 mm and 30 mm. According to this distance, the width of the central electrode P6 is determined.

Specifically, it is determined that the width of the central electrode P6=the width of the rear glass substrate 2−(the width of the edge electrode P4)×2−(the distance between the central electrode P6 and the edge electrode P4)×2. The width of the central electrode P5 can be adjusted within a range of around ±5 mm with respect to the width of the central electrode P6.

The width of the belt-like electrodes P7 and P8 is obtained by subtracting about 4 mm to 8 mm from the distance between the edge electrode P1 and the central electrode P5 or the distance between the edge electrode P2 and the central electrode P5. This is for the purpose of setting the distance between belt-like electrodes P7 and P8 and the electrodes adjacent therewith to 3 mm±1 mm. This is because, if this distance between the electrodes is wider, lack of uniformity occurs in the brightness on the surface when adjusting the light amount, while the arc discharge occurs between the electrodes if the distance is narrow. In the same manner, it is also possible to determine the width of the belt-like electrodes P9 and P10 based upon the relationship described above, with respect to the edge electrodes P3 and P4 and the central electrode P6.

Next, an energizing circuit of the flat type fluorescent lamp comprises, as shown in FIG. 4, a first inverter 5, a second inverter 6, an inverter clock 7 for determining a clock for each of the inverters 5 and 6, a light amount adjusting clock 8 for providing an output for adjusting the amount of light which determines the discharge time, AND gates 9 and 10, and so on. Accordingly, the first inverter 5 and the second inverter 6 use the clock commonly, but are separated from each other by the portion high voltage circuits thereof.

The first inverter 5 comprises a transformer 11 for stepping up voltage, a switching element 12, etc. In the same manner, the second inverter 6 also comprises a transformer 13 for stepping up voltage, a switching element 14, etc. In each of the transformers 11 and 13, terminals A and B are provided for connection to the electrodes.

As the gas enclosed or contained within the hermetically sealed container is used one which is obtained by combining a buffer gas, such as Ne, Ar, Kr, etc., with Xe (xenon) as the basis, for suppressing local discharge. Gas pressure is preferable set within a range from 150 torr to 400 torr, for the purpose of obtaining stable discharge. This is because, if pressure fails outside of this range, the local discharge and/or the lack of uniformity in the brightness on surface occur.

A ratio in mixing the Xe gas and the buffer gas is desirably set around 7.5% to 30%. This is because with a ratio outside of this range, local discharge is likely to occur.

Explanation will be given of the function of the flat type fluorescent lamp of the construction mentioned in the above.

First, connecting edge electrodes P1 and P3 to each other, terminal A of first inverter 5 is connected to either edge electrode P1 or edge electrode P3, while terminal B of first inverter 5 is connected to central electrode P6. Also, connecting edge electrodes P2 and P4 to each other, terminal A of second inverter 6 is connected to either edge electrode P2 or edge electrode P4, while terminal B of second inverter 6 is connected to central electrode P6.

Each of the output waveforms of first inverter 5 and second inverter 6 has, as shown in FIG. 5, the same output voltage, the same frequency and a phase difference of 180°, and has a rectangular waveform or one being similar to that, for the purpose of preventing local discharge.

Paying attention to the peaks of the waveforms, since the difference in the phase is 180°, the voltage of 2 V is applied between edge electrodes P1 and edge electrode P3 and between edge electrode P2 and edge electrode P4.

Between edge electrodes P1 and P3 and central electrode P6, and between edge electrodes P2 and P4 and central electrode P6, voltage V is applied originally.

Accordingly, the discharge distance in the portions is smaller than those between the edge electrodes P1 and P3 and between the edge electrodes P2 and P4, the discharge occurs first between the edge electrodes P1 and P3 and the central electrode P6 and between the edge electrodes P2 and P4 and central electrode P6.

Next, the discharge occurs between the edge electrodes P1 and P3 and the edge electrodes P2 and P4.

By this design, illumination of high brightness can be achieved.

In a case wherein adjustment of emitted light amount is necessary, the operation of second inverter 6 is stopped, terminal A of first inverter 5 is connected to edge electrodes P1, P2, central electrodes P5, and two (2) belt-like electrodes P7 and P8, while terminal B of first inverter 5 is connected to edge electrodes P3 and P4, central electrode P6, and two (2) belt-like electrodes P9 and P10.

With this, the discharge distance comes to be a sum of the thickness of the front glass substrate 1 and the rear glass substrate 2 and the thickness of the discharge space, and the efficiency of brightness is decreased, therefore illumination of low brightness can be achieved.

As another method for adjusting the light amount, it is also possible to adjust the light amount by conducting the discharge between the edge electrodes P1 and P3 and the central electrode P6 and the discharge between the edge electrodes P2 and P4 and the central electrode P6 in a manner of time-sharing. In this instance, it can be achieved by adding a circuit that alternatively turns AND gates 9 and 10 shown in FIG. 4 ON and OFF, by means of a flip-flop circuit, or the like.

Further, it is also possible to adjust the light amount by changing the ratio in times between two conditions of phases, while keeping the conditions to be either 0° or 180° in the phase differences between the first inverter 5 and the second inverter 6.

Namely, the discharge between the edge electrodes P1 and P3 and the discharge between the edge electrodes P2 and P4 are controlled ON and OFF, in a time-sharing manner. When the phase difference is 0°, the discharge does not occur under the OFF condition, while when the phase difference is 180°, the discharge occurs under the ON condition.

The central electrode P5 and the four (4) belt-like electrodes P7, P8, P9 and P10 are under the floating condition when the lamp is illuminated at high brightness, however this is not a factor giving an influence directly upon the illumination at high brightness. Actually, the electric potential is caused or established through the front glass substrate 1 or the rear glass substrate 2, and this contributes to the stabilization in distribution of the electric potential with respect to a long distance discharge between the edge electrodes P1 and P3 and the edge electrodes P2 and P4. From this, it is possible to realize both the illumination at high brightness and the illumination at low brightness by exchanging such electrodes which are provided in advance, depending upon the necessity thereof.

Next, explanation will be given on examples 1 to 3, in which the flat type fluorescent lamp according to the present invention is applied to form a flat type back light of 7 inches, with the conditions of trial manufacturing and the test results thereof.

First, of all, in the case of example 1, the thickness of each of the front glass substrate 1 and the rear substrate 2 is 3 mm, and the thickness of the discharge space D is 2.2 mm.

The width of the edge electrodes P1 and P2 is 10 mm, and the width of the edge electrodes P3 and P4 is 5 mm. The width of the central electrodes P5 and P6 is 44 mm, the distance between the edge electrodes P1 and P3 and the central electrode P5 is 13 mm, and the distance between the edge electrodes P2 and P4 and the central electrode P6 is 18 mm.

The width of the belt-like electrodes P7 and P8 is 7 mm, and the width of the belt-like electrodes P9 and P10 is 12 mm.

Also, as the surface electrodes, i.e., each of the edge electrodes P1 and P2, the central electrode P5 and the belt-like electrodes P7 and P8 is formed of ITO film having a thickness of about 30 nm.

The gas enclosed is Xe+Ne, wherein the total pressure thereof is set at 175 torr while the partial pressure of Xe at 45 torr.

Terminal A of first inverter 5 is connected edge electrodes P1 and P3, while terminal B of first inverter 5 is connected to central electrode P6. Also, terminal A of second inverter 6 is connected edge electrodes P2 and P4, while terminal B of second inverter 6 is connected to central electrode P6.

The output voltage of first inverter 5 and second inverter 6 are 3 kVp-p, and the frequency thereof is 16 kHz. The frequency is adjusted within the vicinity of the resonance frequency of a LCR resonance circuit that is constructed with set-up or booster transformers 11 and 13 and the electrostatic capacitance of the flat type fluorescent lamp itself.

Under such a condition, there can be measured illumination of 7,000 nit at central brightness with a light emitting area of 13,320 $cm^2$, with the difference in brightness of ±3% from the periphery portion and with consumption of electric power of 20 W of the inverters (i.e., for illumination at high brightness). The range of adjustment of the amount of light, under this illumination at high brightness, is from 100% to 20%.

Also, stopping the operation of the second inverter 6, the lamp is energized under the condition that terminal A of first inverter 5 is connected to edge electrodes P1 and P2, central electrode P5 and two (2) belt-like electrodes P7 and P8, while terminal B of first inverter 5 is connected to edge electrodes P3 and P4, central electrode P6 and two (2) belt-like electrodes P9 and P10 (i.e., for illumination at low brightness).

Under such illumination at low brightness, there can be realized the adjustment of brightness from around 2,000 nit to 150 nit, and the adjustable range of the possible brightness is from 29% to 2.1%.

Next, in the case of example 2, the thickness of the front glass substrate 1 and the rear glass substrate 2 is selected to be 1.3 mm while inserting within the discharge space a spacer having thickness about 0.2 mm and outer width being equal to the width of the discharge space, and the thickness D of the discharge space is thus set to be 1.8 mm. Other conditions are same as those in the case of example 1.

Under such a condition, there can be realized illumination at 7,000 nit of central brightness with a light emitting area of 13,320 cm$^2$, with the difference in brightness of ±3% from the periphery portion and with electric power consumption of 15 W of the inverters (i.e., for illumination at high brightness). The range of adjustment of the amount of light, under this illumination at high brightness, is from 100% to 18%. In contrast to the fact that 20 W is needed for obtaining the illumination of 7,000 nit at central brightness in example 1, 15 W is enough in example 2, i.e., the energy consumption result is lower by 5 W.

Also, stopping the operation of the second inverter 6, the lamp is energized under the condition that terminal A of first inverter 5 is connected to edge electrodes P1 and P2, central electrode P5 and two (2) belt-like electrodes P7 and P8, while connecting terminal B of first inverter 5 is connected to edge electrodes P3 and P4, central electrode P6 and two (2) belt-like electrodes P9 and P10 (i.e., for illumination at low brightness).

Under this illumination at low brightness, there can be realized the adjustment of brightness from around 2,000 nit to 150 nit, and the range in adjustment of brightness is from 29% to 2.1% of the maximum. This is the same result as found for example 1.

Next, in the case of example 3, the thickness of the front glass substrate 1 and the rear glass substrate 2 is set to be about 1.1 mm while inserting within the discharge space a spacer having thickness about 0.2 mm and outer width being equal to the width of the discharge space, and the thickness D of the discharge space is thus set to be 1.8 mm.

As above, the gas enclosed is Xe+Ne, but wherein the total pressure thereof is set at 350 torr while the partial pressure of Xe at 35 torr. Other conditions are same to those in the cases of examples 1 and 2.

Under such a condition, there can be realized illumination at 7,000 nit of central brightness with a light emitting area of 13,320 cm$^2$, with the difference in brightness of ±3% from the periphery portion and with electric power consumption of 20 W of the inverters (i.e., for illumination at high brightness). The range of adjustment of the amount of light, under this configuration for illumination at high brightness, is from 100% to 30%. This compares different from the range of adjusting the amount of light from 100% to 20% in the first example and identically to the 100% to 30% range in the third example.

Also, stopping the operation of the second inverter 6, the lamp is energized under the condition that terminal A of first inverter 5 is connected to edge electrodes P1 and P2, central electrode P5 and two (2) belt-like electrodes P7 and P8, while connecting terminal B of first inverter 5 is connected to edge electrodes P3 and P4, central electrode P6 and two (2) belt-like electrodes P9 and P10 (i.e., for illumination at low brightness).

Under illumination at low brightness, there can be realized the adjustment of brightness from around 3,000 nit to 240 nit, and the range in adjustment of brightness is from 43% to 3.5%.

The conditions of trial manufacturing of the flat type fluorescent lamps according to examples 1 to 3 mentioned in the above, the test results for illumination at high brightness under the trial manufacturing conditions and for illumination at low brightness with only the first inverter are shown in the following Tables 1 to 3, collectively.

TABLE 1

Conditions of Trial Manufacturing of Flat Type Fluorescent Lamp:

| | Example 1 | Example 2 | Example 3 |
|---|---|---|---|
| Thickness of Front glass Substrate 1 and Rear Glass Substrate 2 | 3 mm | Insert Spacer of 1.3 mm | Insert Spacer of 1.1 mm |
| Thickness D of Discharge Space | 2.2 mm | Same as Example 1 | |
| Width of Edge Electrodes P1 and P2 | 10 mm | Same as Example 1 | |
| Width of Edge Electrodes P3 and P4 | 5 mm | Same as Example 1 | |
| Width of Central Electrodes P5 and P6 | 44 mm | Same as Example 1 | |
| Distance Between Edge Electrodes P1 and P3 and Central Electrode P5 | 13 mm | Same as Example 1 | |
| Distance Between Edge Electrodes P2 and P4 and Central Electrode P6 | 18 mm | Same as Example 1 | |
| Width of Belt-like Electrodes P7 and P8 | 7 mm | Same as Example 1 | |
| Width of Belt-like Electrodes P9 and P10 | 12 mm | Same as Example 1 | |
| Surface Electrodes P1, P2, P5, P7 and P8 | ITO Film Thickness 30 nm | Same as Example 1 | |
| Enclosed Gas Xe/Ne | Total Pes. 175 torr Xe Partial Pres. 45 torr | Same as Example 1 | Total Pres. 350 torr Xe Partial Pres. 35 torr |
| Output Voltage of First Inverter 5 and Second Inverter 6 | 3kVp-p | Same as Example 1 | |
| Frequency of First Inverter 5 and Second Inverter | 16 kHz | Same as Example 1 | |

TABLE 2

Test Results of Illumination at High Brightness:

| | Example 1 | Example 2 | Example 3 |
|---|---|---|---|
| Difference in Brightness Between Center and Periphery (%) | 7,000 nit ± 3% | Same as Example 1 | Same as Example 1 |
| Power Consumption of Inverter | 20 W | 15 W | 20 W |
| Adjustable Range of Light Amount | 100%–20% | 100%–18% | 100%–30% |

TABLE 3

Test Results of Illumination at Low Brightness:

|  | Example 1 | Example 2 | Example 3 |
|---|---|---|---|
| Changeable Range of Central Brightness | 2,000 nit–150 nit | Same as Example 1 | 3,000 nit–240 nit |
| Adjustable Range of Light Amount | 29%–2.1% | Same as Example 1 | 43%–3.5% |

As is fully explained in the above, according to the present invention, it is possible to maintain the stable discharge if the distance between the electrodes is large, and moreover it is possible to improve the efficiency in brightness which was raised as a drawback of the conventional back light free from mercury.

According to the present invention, it is possible to form the electrodes for illumination at high brightness and the electrodes for illumination at low brightness as a common plane surface, thereby enabling the adjustment of the amount of light from 100% to 2%. a property which was difficult to achieve in the device according to the conventional arts.

According to the present invention, it is possible to perform the adjustment of light amount by means of the same circuit, without providing the circuit for high brightness illumination and the circuit for low brightness illumination, independently.

According to the present invention, it is possible to obtain the surface discharge being stable and uniform.

What is claimed is:

1. A flat type fluorescent lamp, illuminating with no use of mercury therein, comprising:

a sealed container being defined by a front substrate and a rear substrate which are hermetically bonded to each other, so as to enclose a rare gas as a discharge gas therein;

edge electrodes being provided at both end portions on an outer surface of said sealed container;

other edge electrodes being provided at both end portions on another outer surface of said sealed container, wherein the edge electrodes on the outer surface are connected to each other and the other edge electrodes on the another outer surface are connected to each other;

a first inverter being connected between one of said edge electrode and a central electrode which is provided in a central portion of one of the outer surface and the another outer surface; and a second inverter being connected between the outer edge electrodes and said central electrode, wherein said first inverter and said second inverter provide rectangular waveform outputs, being same in frequency thereof and having phases different to each other, thereby illuminating the lamp.

2. The flat type fluorescent lamp, as defined in claim 1, wherein a width of each of said edge electrodes provided at both ends of said one of the outer surface and the another outer surface is from 2.5 mm to 10 mm, and a width of each of said other edge electrodes provided at both ends of said another outer surface is from 5 mm to 20 mm.

3. The flat type fluorescent lamp, as defined in claim 1, wherein one belt-like electrode is provided between each of said edge electrodes on said outer surface and said central electrode, while three belt-like electrodes are provided between said outer edge electrodes on said another outer surface, wherein a width of the belt-like electrode lies within a region being ±1 mm with respect to a width of said central electrode.

4. The flat type fluorescent lamp, as defined in claim 3; wherein the distances between adjacent of said one belt-like electrode, said edge electrodes, said central electrode, said three belt-like electrodes, and said other edge electrodes lie from 2 mm to 4 mm.

5. The flat type fluorescent lamp, as defined in claim 3, wherein all of the edge electrodes on said outer surface are connected to one another, while all of the other edge electrodes on said another surface are connected to one another, and one of said first inverter and said second inverter is connected between the edge electrode on said outer surface and the other edge electrodes on said another outer surface.

6. The flat type fluorescent lamp, as defined in claim 1, wherein a thickness of said substrates is from 1.1 mm to 4 mm.

7. The flat type fluorescent lamp, as defined in claim 1, wherein a thickness of a discharge space defined therein is from 1.3 mm to 4 mm.

8. The flat type fluorescent lamp, as defined in claim 1, wherein pressure of the gas is from 150 torr to 400 torr, and partial pressure of an excitation gas is from 7.5% to 30%.

* * * * *